United States Patent [19]

Kudoh et al.

[11] Patent Number: 5,391,431
[45] Date of Patent: Feb. 21, 1995

[54] MAGNETO-OPTICAL RECORDING MEDIUM

[75] Inventors: Yoshihiko Kudoh, Yawata; Masahiro Birukawa, Hirakata, both of Japan

[73] Assignee: Matsushita Electric Industrial Co., Ltd., Japan

[21] Appl. No.: 24,317

[22] Filed: Mar. 1, 1993

[30] Foreign Application Priority Data

Feb. 28, 1992 [JP] Japan .................. 4-041865

[51] Int. Cl.⁶ .................. B32B 5/16; G11B 5/66
[52] U.S. Cl. .................. 428/336; 369/13; 428/611; 428/635; 428/655; 428/694 ML; 428/694 SC; 428/694 MM; 428/900; 428/694 SG; 257/15; 257/28; 365/122
[58] Field of Search .................. 428/611, 655, 694 SC, 428/694 MM, 694 ML, 694 SG, 336, 900, 635; 257/15, 28; 369/13; 365/122

[56] References Cited

U.S. PATENT DOCUMENTS 4,690,861 9/1987 Nakamura et al. .................. 428/623
5,231,294 7/1993 Takeuchi et al. .................. 257/28

FOREIGN PATENT DOCUMENTS 62-31051 2/1987 Japan .

OTHER PUBLICATIONS

Nakazawa et al., *J. Magn. Soc. Jpn*, "Studies on the Thermal Stability of Pd/Co Multilayered Films Using XRD and TEM Observations" vol. 15, Suppl. No. S1 (1991) pp. 255–258.

Wang et al., *Journal de Physique*, "Structural and Magnetic Properties in MnBiAlSi and MnBiSbSi Films" vol. 49 (12), pp. 1725–1726 (1988).

Katsui, *J. Appl. Phys.*, vol. 47, No. 8 (1976) "Magnetic and Magneto-optic Properties of Ferromagnetic MnCuBi Thin Films" pp. 3609–3611.

Under et al. *J. Appl. Phys.*, vol. 43, No. 6, (1972) "Structural, Magnetic, and Magneto-Optic Properties of Ti--Substituted MnBi Films" pp. 2875–2879.

Yusu et al., *JJAP*, Series 6, Proc. Int. Symp. on Optical Memory, (1991) "Kerr Enhancement by Layer Modulation in Co/Pt Multilayers" pp. 27–30.

Mojejko et al., *Journal of Crystal Growth*, 36, (1976) "Structural Investigations of Thin Antimony Films" pp. 61–70.

*Primary Examiner*—Stevan A. Resan
*Assistant Examiner*—R. Follett
*Attorney, Agent, or Firm*—Wenderoth, Lind & Ponack

[57] ABSTRACT

A magneto-optical recording medium comprises a base film having a certain crystal plane oriented in parallel to a substrate and a recording film formed on the base film. The recording film is composed of plural pairs of Mn alloy group magnetic thin film layer having a C-axis-oriented crystalline magnetic anisotropy and a nonmagnetic thin film layer having an interatomic spacing approximate to that of the base film, alternately laminated each other, so that the Mn alloy group magnetic film having a C-axis-oriented crystalline magnetic anisotropy is epitaxially grown on the substrate at a low temperature through the base film with high thermal stability and great magneto-optical effect.

12 Claims, 6 Drawing Sheets

MAGNETO-OPTICAL RECORDING MEDIUM

BACKGROUND OF THE INVENTION

1. Field of the Invention

The present invention relates to a magneto-optical recording medium, and more in particular to a magneto-optical recording medium in which data is magnetically recorded by heating the recording medium up to an increased temperature with use of laser beams and from which the recorded information is reproduced by utilizing the magneto-optical effect thereof.

2. Description of the Prior Art

A basic arrangement of a conventional magneto-optical recording medium is as shown in FIGS. 9 and 10. More specifically, on a substrate 71, a perpendicular magnetization film having a magneto-optical effect is formed as a recording film 73 with a protective film 72 interposed therebetween. Further, a protective film 74 is provided on the recording film 73 directly thereon or with a reflective film 75 interposed between the recording film 73 and the protective film 74.

The recording and erasing operation of data on the magneto-optical recording medium is effected in such a way that the recording film 73 is locally heated by irradiation of a laser beam up to a temperature which is higher than the compensation temperature thereof at which the coercive force is made small or over around the Curie temperature to reduce the coercive force of the irradiated portion with a laser beam of the recording film 73 so that the irradiated portion of the recording film 73 is magnetized in the direction of the external magnetic field, which is so-called thermomagnetic recording.

On the other hand, the reproduction of the recorded data is carried out in such a way that a laser beam lower in power than that in recording and erasing operation is irradiated to a portion of the recording medium to rotate a polarization plane of the reflected light or transmitted light of the irradiated laser beam according to the recording state, i.e. direction of magnetization of the recording film 73, which the rotation of the polarization plane takes place due to a magneto-optical effect, so called Kerr effect or Faraday effect. The rotation of the polarization plane is detected as a variation in light intensity by using an analyzer.

Furthermore, with regard to magnetic materials of the recording film 73, in order to implement high-density recording by reducing the interference between the magnetization in opposite directions, there is used a magnetic material having a perpendicular magnetic anisotropy as the recording film 73 for the magneto-optical recording medium.

Conventionally, as a recording film for the magneto-optical recording medium, there have been available some types of films: (1) rare-earth-transition-metal alloy magnetic films, such as TbFeCo; (2) Mn alloy magnetic films, such as MnBi; (3) oxide magnetic films, such as YIG, and the like.

Among such conventional recording films for the magneto-optical recording medium, when using the films of type (1), although the type (1) films are amorphous and therefore there are such advantages that the films are free of noise generation due to crystal grain boundaries during reproduction and there can be rather readily obtained perpendicular magnetic anisotropy films, yet there are problems of inferiority in resistances to oxidation and corrosion and having not so substantially great magneto-optical effect. Regarding these problems, in order to improve the oxidation and corrosion resistances, there has been taken such means that the recording film is protected with protective films 72 and 74 formed of an oxide film such as $SiO_2$, or a nitride film such as SiN, as shown in FIG. 9. Also, in order to make up for the lack of magneto-optical effect, the film thickness of the protective film 72 in the incident side of reproducing light is so selected that the quantity of reflected light becomes minimum in relation to its refractive index, thereby enhancing the apparent Kerr effect. Alternatively, as shown in FIG. 10, a reflective film 75 is provided behind the recording film 73 having such a thickness as to transmit the reproducing light to some extent, thereby forming an arrangement that takes advantages of the Faraday effect as well as Kerr effect of the recording film 73. These measures, however, do not suffice for the magneto-optical effect. In particular, since the Kerr rotation angle decreases as the wavelength of light is made shorter, it is impossible to implement higher-density recording by use of shorter-wavelength laser beams.

On the other hand, the films of types (2) and (3), while there is an advantage that some are relatively great in their magneto-optical effect, some are involved with a problem that, because of crystalline films, there exhibits characteristic deterioration caused by generation of reproducing noise due to crystal grain boundaries, or by their thermal instability. These types of films also have a problem that, in order to obtain a perpendicular magnetic anisotropy film, it is necessary to heat a substrate at high temperature during film formation or a heat treatment process at a high temperature after film formation, resulting in a disadvantage that a plastic substrate is inapplicable. In particular, when preparing a perpendicular magnetic anisotropy film of a type (3) oxide magnetic film, it is necessary for the substrate to be heated or to be subjected to heat treatment at a high temperature of 500° C. or higher. Further, since the type (3) of oxide magnetic films are nearly transparent, the thickness of the recording film 73 can be increased even when the arrangement of FIG. 10 is adopted. Accordingly, their apparent magneto-optical effect can be increased, but their magneto-optical effect depends largely upon the wavelengths, resulting in a very narrow range of wavelengths at which the magneto-optical effect is substantially great, as low as 100 nm or less. In consequence, the above-mentioned conventional recording films cannot keep up with a large Kerr rotation angle when the wavelengths of laser beams is shortened by degrees as the laser technique progresses for high density recording.

SUMMARY OF THE INVENTION

Accordingly, an essential objective of the present invention is to provide a high-performance magneto-optical recording medium with improvement of thermal stability of Mn alloy magnetic films having a relatively great magneto-optical effect in a wide wavelength range of 400 to 830 nm thereby allowing the formation of a magnetic recording film even on a plastic substrate.

To achieve the objective mentioned above, the present invention provides an arrangement of a magneto-optical recording medium as a first feature that, on a substrate there is provided a base film made of hexagonal or rhombohedral crystal having its (001) plane oriented in parallel with the plane of the substrate, and on the base film there is formed a recording film which is constructed by laminating alternately a plurality of pairs of Mn alloy magnetic layer and nonmagnetic layer each other, where each of the Mn alloy magnetic layers has a C-axis-oriented crystalline magnetic anisotropy, which is of a hexagonal crystalline system having its lattice constant in the plane (00k) approximate to the lattice constant in the plane (00l) of the base film and, and each of the nonmagnetic layers is of a hexagonal or rhombohedral crystalline system having its lattice constant in the plane (00h) approximate to the lattice constant in the plane (00l) of the base film, each of the Mn alloy system magnetic layers and nonmagnetic layers having a thickness of 5 nm or less, where the numerals l, k, and h represent a positive integer.

The present invention also provides another arrangement of a magneto-optical recording medium as a second feature that, on a substrate there is provided a base film made of face centered cubic crystal having its (111) plane oriented in parallel with the plane of the substrate, and on the base film there is formed a recording film which is Constructed by laminating alternately a plurality of pairs of Mn alloy magnetic layer and nonmagnetic layer each other, where each of the Mn alloy magnetic layers has a C-axis-oriented crystalline magnetic anisotropy, which is of a hexagonal crystalline system having its lattice constant in the plane (00k) approximate to the interatomic spacing in the plane (111) of the base film, and each of the nonmagnetic layers is of face centered cubic crystal having its interatomic spacing in the plane (hhh) approximate to the interatomic spacing in the plane (111) of the base film, each of the Mn alloy magnetic layers and nonmagnetic layers having a thickness of 5 nm or less, where the numerals l, k, and h represent a positive integer.

Further, the present invention provides an arrangement of a magneto-optical recording medium as a third feature that, the base film is of a hexagonal or rhombohedral crystalline as in the first feature and each of the nonmagnetic layers is of a face centered cubic crystalline as in the second feature, where the nonmagnetic layers and the Mn alloy magnetic layers are alternately laminated on the base film each other in the same manner as in the first and second features.

Furthermore, the present invention provides another arrangement of a magneto-optical recording medium as a fourth feature that, the base film is of a face centered cubic crystalline as in the second feature and each of the nonmagnetic layers is of a hexagonal or rhombohedral crystalline as in the first feature, where the nonmagnetic layers and the Mn alloy magnetic layers are alternately laminated on the base film each other as in the first and second method.

With the above-described arrangements, on a substrate there is formed a base film having a crystal plane oriented in parallel with the plane of the substrate, and on the base film there is epitaxially grown a Mn alloy crystalline magnetic layer having a C-axis-oriented crystalline magnetic anisotropy. It is noted here that the term of "C-axis-oriented crystalline magnetic anisotropy" means a property of tending to magnetically oriented in the C-axis direction perpendicular to the plane (00k) of a crystal. Further, by limiting the thickness of the magnetic layer and alternately laminating the magnetic layers with nonmagnetic layers having an atomic arrangement approximate to that of the base film over and over, there is formed a magnetic recording film having a magnetic layer thermally stabilized with its epitaxial growth facilitated. Thus, the magnetic recording film is endowed with perpendicular magnetic anisotropy and thermal stability.

The function of the magneto-optical recording medium constructed as mentioned above is explained hereinbelow.

On a substrate heated at a low temperature of 130° C. or below, there is provided a base film of hexagonal or rhombohedral crystal having its plane (001) oriented in parallel to the plane of the substrate. It is known that, when using rhombohedral crystals such as Sb or hexagonal crystals such as Te as the base film, with adjustment of the conditions for film formation, it becomes possible to easily obtain a base film having its crystal plane (001) oriented in parallel to the plane of the substrate at a temperature of 130° C. or lower (see, e.g., K. Mojejko et al.: Journal of Crystal Growth 36 (1976) pp. 61–70).

Further, on the base film, there is formed a Mn alloy magnetic film layer which is of a hexagonal crystal having its lattice constant in the plane (00k) approximate to that of the base film and which has a C-axis-oriented crystalline magnetic anisotropy. It is noted here that, the plane (001) of rhombohedral crystal and the plane (00k) of hexagonal crystal each having a crystalline angle of around 60 degrees formed by its crystalline axis have their atomic arrangement approximate to each other. Accordingly, if the lattice constants in their respective planes are approximate to each other, it is possible to epitaxially grow on the base film a Mn alloy magnetic layer of hexagonal crystals having a C-axis-oriented crystalline magnetic anisotropy.

However, a Mn alloy magnetic layer composed of two or more elements tends to be disarranged in its orientation of crystal plane if the thickness of the layer increases, and in worse cases it may be subjected to some amorphous change. Further, a crystal phase change causing thermal instability of Mn alloy magnetic layers will be accompanied by movement of atoms. Therefore, if the thickness of the alloy magnetic layer excessively increases, such crystal phase change will tend to occur.

In order to suppress such occurrence of crystal phase change, a Mn alloy magnetic layer provided on a base film is reduced in thickness to an extremely small degree in such a range that the orientation of its crystal face will not be disarranged. Further, on the Mn alloy magnetic layer, there is formed a hexagonal or rhombohedral crystalline nonmagnetic layer having its lattice constant in the plane (00h) approximate to that of the base film in order to arrange the orientation of crystal face of the Mn alloy magnetic layer, where the plane (00h) of the nonmagnetic layer is easily oriented in parallel to the plane of the substrate. In this way, by alternately laminating a Mn alloy magnetic thin layer and a nonmagnetic thin layer each other by pairs, it is possible to retain the orientation of crystal face suppressing any crystal phase change in the magnetic layer. Thus, it becomes possible to obtain a recording film which has a perpendicular magnetic anisotropy and thermal stability under a low-temperature condition of a substrate at 130° C. or lower.

In this connection, it is known that, when using face centered cubic crystal materials such as Pt and Co, adjustment of the conditions for film formation would allow to easily obtain a film having its plane (111) oriented in parallel to the plane of a substrate at a low temperature of 130° C. or lower (see, e.g. K. Yusu et al.:

Proc. Int. Symp. on Optical Memory, 1991, Jpn, J. Appl. Phys. Series 6 (1991) pp. 27–30).

Therefore, a base film of face centered cubic crystal such as Pt and Co can be easily provided on a substrate at a temperature of 130° C. or lower with its crystal plane (lll) being in parallel to the plane of the substrate.

On the base film, there is further formed a Mn alloy magnetic film layer which is of a hexagonal crystalline system material having its lattice constant in its crystal plane (00k) approximate to the interatomic spacing in the plane (lll) of the base film and which has a C-axis-oriented crystalline magnetic anisotropy. It is noted here that the atomic arrangement in the plane (lll) of face centered cubic crystal is approximate to the atomic arrangement in the plane (00k) of hexagonal crystal. Accordingly, if the interatomic spacing in the plane (lll) of the base film and the lattice constant in the plane (00k) of a Mn alloy system magnetic layer are approximate to each other, it is possible to epitaxially grow a Mn alloy magnetic film of a hexagonal crystal having a C-axis-oriented crystalline magnetic anisotropy, on the base film. In consequence, even when face centered cubic crystals are used as the base film and as the nonmagnetic layer in place of using the aforementioned hexagonal or rhombohedral crystals, similar effects can be obtained.

Furthermore, since it is known that thermal instability of magnetic layers can be improved to some extent also by adding additive elements such as Al, Cu, Ge, Pt, Si, Ti and the like, magnetic layers to be laminated may be ones in which these elements have been added. (The effect of adding the additive elements is described, for example, in the following literatures: W. K. Unger et al.: J. Appl. Phys., 43 (1972) 2875; A. Kalsui: J. Appl. Phys., 47 (1976) 3609; and Y. J. Wang et al.: J. de Phys., c8 (1988) 1725.)

As described above, in the arrangements of the magneto-optical recording medium according to the present invention, it is possible to adopt Mn alloy magnetic films as a recording film, solving the problems in the art that, although having a relatively great magneto-optical effect, Mn alloy magnetic layers have conventionally been incapable of being formed on a plastic substrate because of a high-temperature process involved for obtaining a perpendicular magnetic anisotropy film, or that the Mn alloy magnetic layers have been poor in thermal stability. Thus, an excellent magneto-optical recording medium can be realized with a relatively great magneto-optical effect in a wide range of wavelength.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Embodiment 1

Figure 1:
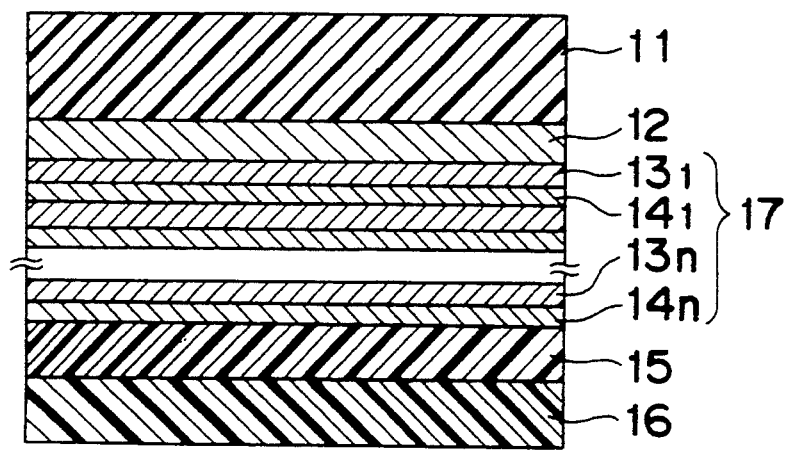
FIG. 1 is a cross sectional view showing an arrangement of a magneto-optical recording medium according to a first embodiment of the present invention.
Figure 2:
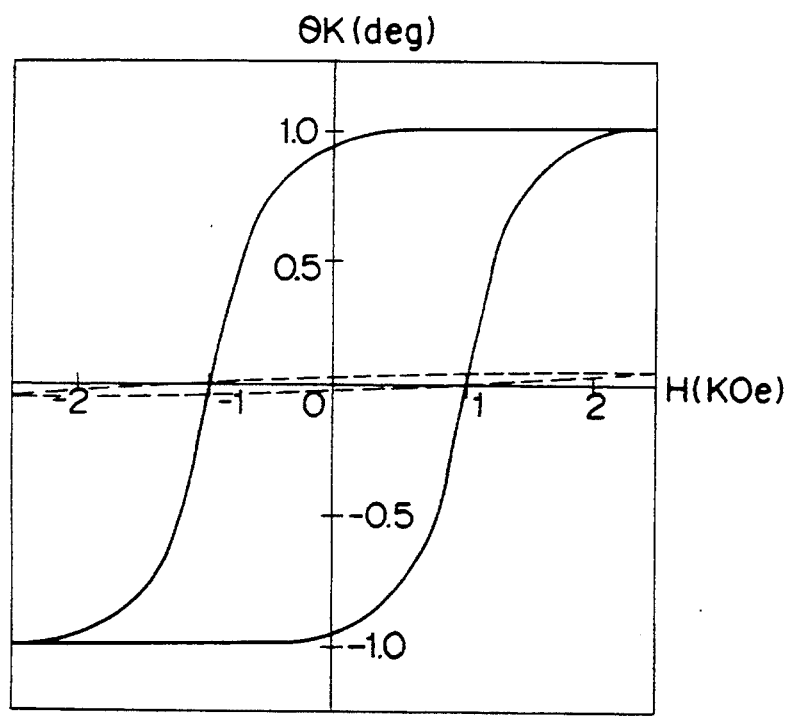
FIG. 2 is a graphical representation showing a Kerr hysteresis loop in the direction perpendicular to the film plane of the magneto-optical recording medium according to the first embodiment of the invention.
Figure 3:
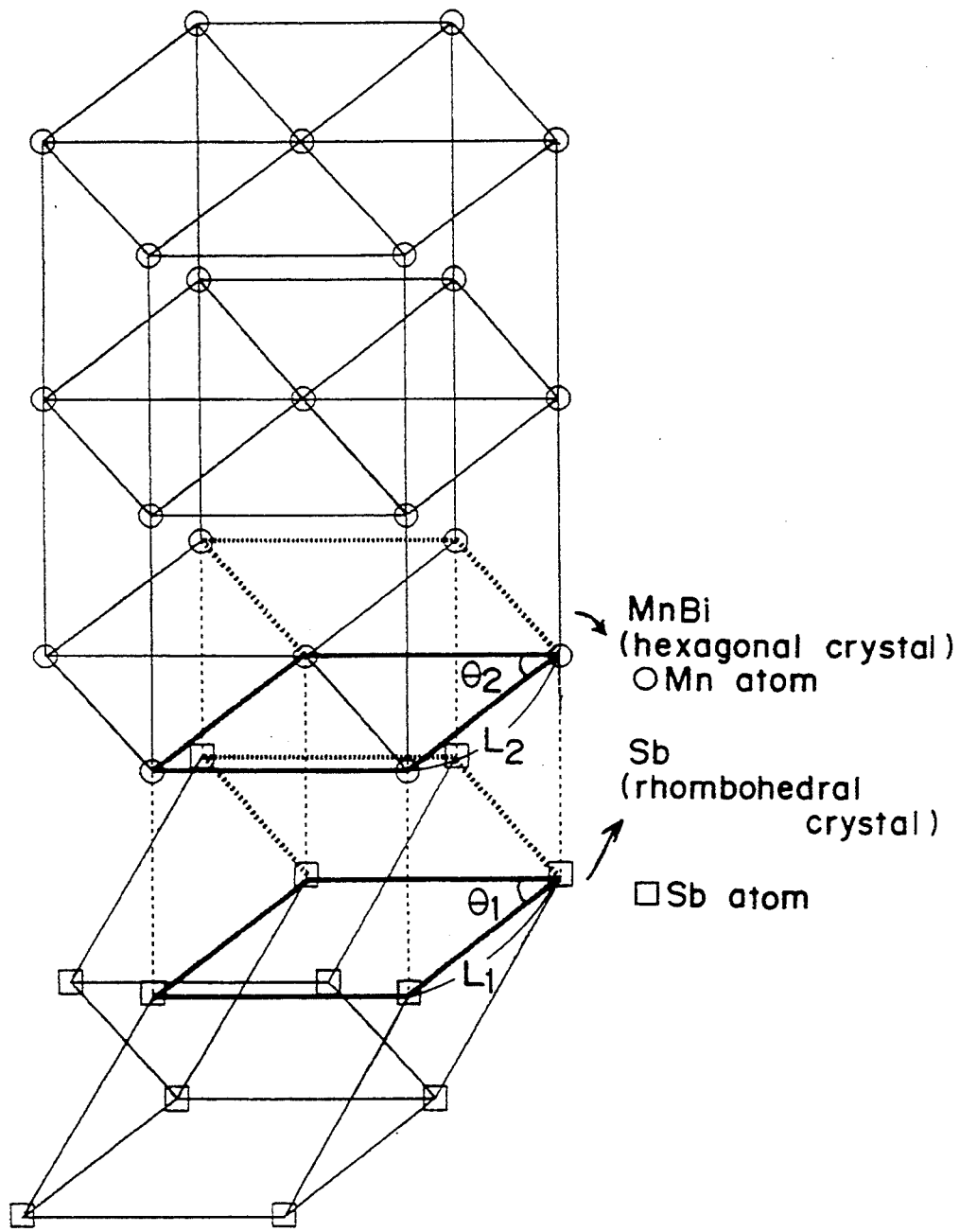
FIG. 3 is a schematic view showing an atomic arrangement of a MnBi magnetic layer and Sb base film according to the first embodiment of the present invention.

The following describes a first embodiment of a magneto-optical recording medium according to the present invention with reference to FIGS. 1 to 3.

Referring to FIG. 1, reference numeral 11 denotes a substrate made of transparent plastics such as polycarbonate, glass, or the like materials; reference numeral 12 a base film made of rhombohedral crystal such as Sb; $13n$ (n=4 to 50) a magnetic film layer made of Mn alloy material such as MnBiAl; $14n$ (n=4 to 50) a nonmagnetic film layer made of rhombohedral crystal such as Sb which is the same material as that of the base film 12 in this case. Each of the MnBiAl magnetic layers $13n$ as well as the Sb nonmagnetic layers $14n$ is made thin in thickness of 0.5 to 5 nm. Reference numeral 15 denotes a protective film made of SiO for anti-oxidant action; reference numeral 16 a protective coating layer made of an acrylic resin for anti-corrosion; and reference numeral 17 denotes a recording film. The recording film 17 is formed by alternately laminating the MnBiAl magnetic layers $13n$ and Sb nonmagnetic layers $14n$ each other to have n pairs of magnetic and nonmagnetic layers $(13_1, 14_1; \ldots; 13_n, 14_n)$ (n=4 to 50) on the base film 12.

In this case, the films 12 to 16 provided on the substrate 11 were formed by magnetron sputtering or vacuum evaporation under the conditions of a base pressure of $10^{-6}$ Torr or lower, a substrate temperature of 30° to 130° C., and a film forming rate of 0.1 to 3 nm/sec. The condition of film thickness was so set that the base film 12 was 5 to 10 nm, the protective film 15 was 80 to 100 nm, the protective coating layer 16 was 3 to 6 $\mu$m, and the recording film 17 was 25 to 50 nm.

The X ray diffraction patterns of the Sb base film 12 and the recording film 17 formed under the above-described conditions were measured and, as a result, it was verified that, due to the orientation of the plane (00l) of the base film 12, the plane (00k) of the recording film is also oriented in parallel to the plane of the substrate so that the C axis of the recording film is oriented perpendicular to the plane of the substrate.

FIG. 2 shows a Kerr hysteresis loop (measuring wavelength: 830 nm) in the direction perpendicular to the film plane of the magneto-optical recording medium having the above-described arrangement. The rectangular ratio of the Kerr hysteresis loop is approximately 1, while in the figure, a broken line shows a Kerr hysteresis loop for comparison when a MnBiAl magnetic recording film is formed directly on the substrate without forming a base film nor nonmagnetic film layer. As apparent from the figure, when using a base film and nonmagnetic film layer in a selected condition, a successful perpendicular magnetic anisotropy film can be obtained.

This result can be attributed to the following facts. That is, the Sb film, which is of a rhombohedral crystal, has its crystal plane (001) oriented in parallel to the plane of the substrate at a substrate temperature of 130° C. or lower depending on the selected film formation conditions. Further, the atomic arrangement of the Sb film is successfully matched with the atomic arrangement of the MnBiAl film, so that a MnBiAl film can be epitaxially grown with an Sb film used as the base film. Finally, the MnBiAl film has a C-axis-oriented crystalline magnetic anisotropy.

In this case, the coercive force was around 1 kilooersted, and the Kerr rotation angle was around 1.0 degree, which testifies that excellent performance as a magneto-optical recording medium was obtained. Further, the Kerr rotation angle showed a large value as much as 0.7 degree or more in a wide range of wavelength from 400 to 830 nm.

FIG. 3 shows a matched condition between the atomic arrangement of the Sb film and the atomic arrangement of the MnBi alloy film. As shown in FIG. 3, the lattice constant L1 in the plane (003) of the Sb film is approximately 0.45 nm and the angle $\Theta 1$ formed by the crystal axis thereof is approximately 57 degrees, while the lattice constant L2 in the plane (002) of the MnBiAl film of a hexagonal crystal is approximately 0.43 nm and the angle $\Theta 2$ formed by crystal axis thereof is approximately 60 degrees, and therefore the atomic arrangement of the Sb film is successfully matched with the atomic arrangement of the MnBiAl film, so that a MnBiAl film can be epitaxially grown with an Sb film used as the base film.

The magneto-optical recording medium of the present embodiment proved to be relatively stable both thermally and chemically such that neither characteristic deterioration nor generation of corrosion was observed when subjected to rapid cooling after heat treatment at a temperature of 400° C. for one hour and subjected to a leaving test for 2000 hours under a high-temperature, high-humidity environment of 80° C. and 80% RH.

It is noted that, since the Sb film is of a light absorptive material, the thickness of the base film is appropriately limited to 10 nm or less to allow light to transmit the Sb film substantially. Also, since any alloy magnetic film composed of two or more elements tends to be disarranged in its orientation of crystal face as the film thickness increases and to yield a crystal phase change, therefore the thickness of each extremely thin film to be laminated is appropriately 5 nm or less.

Although, in this embodiment, an Sb film is used as the base film 12 and an alternate lamination pair of extremely thin film layers of MnBiAl and Sb each other is used for forming the recording film 17, yet instead of using the Sb film layer, there may be used a Te film layer (hexagonal crystal, lattice constant: approx. 0.45 nm) or As film layer (rhombohedral crystal, angle formed by crystal axes: approx. 55°; lattice constant: approx. 0.41 nm) or the like, and instead of using the MnBiAl film layer as a magnetic film layer, there may be used a MnBi, MnSbBi film layer, or any of these materials with one or more elements selected from Cu, Ge, Pt, Si, Ti, and the like added thereto.

Embodiment 2

Figure 4:
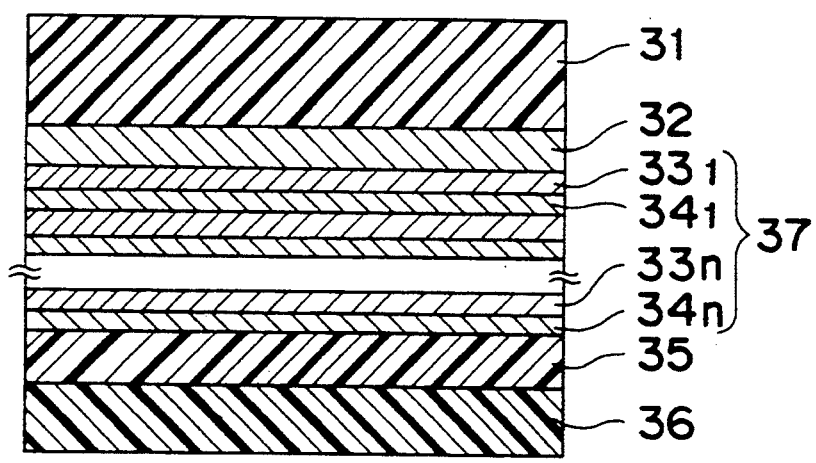
FIG. 4 is a cross sectional view showing an arrangement of a magneto-optical recording medium according to a second embodiment of the invention.
Figure 5:
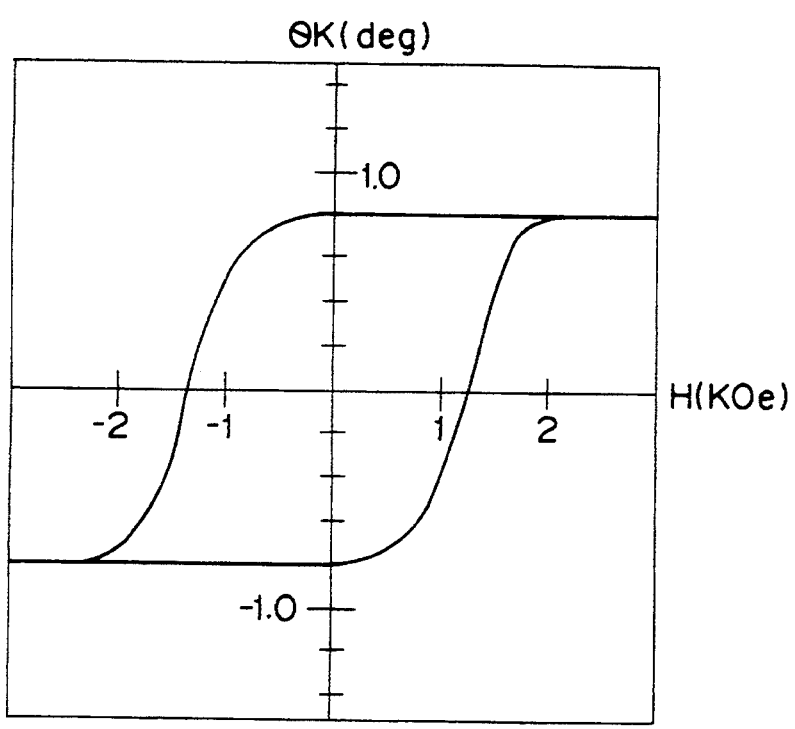
FIG. 5 is a graphical representation showing a Kerr hysteresis loop in the direction perpendicular to the film plane of the magneto-optical recording medium according to the second embodiment of the invention.
Figure 6:
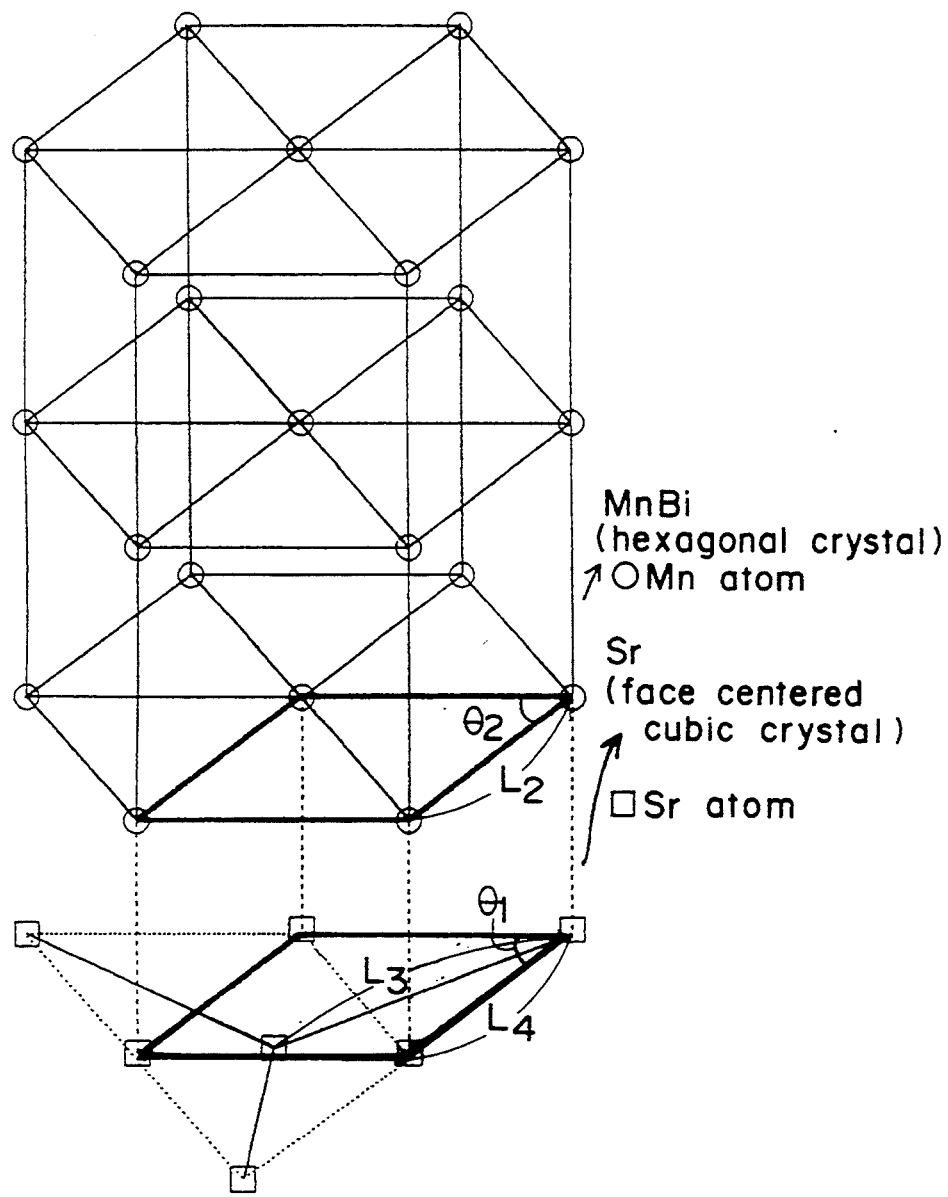
FIG. 6 is a schematic view showing an atomic arrangement of a MnBi magnetic layer and Sr base film according to the second embodiment of the present invention.

The following describes a second embodiment of a magneto-optical recording medium according to the present invention with reference to FIGS. 4 to 6.

Referring to FIG. 4, reference numeral 31 denotes a substrate made of transparent plastics such as polycarbonate, glass, or the like materials; reference numeral 32 a base film made of face centered cubic crystal such as Sr; 33n (n=4 to 50) a magnetic film layer made of Mn alloy system such as MnBiPt: 34n (n=4 to 50) a nonmagnetic film layer made of face centered cubic crystal such as Sr which is the same material as that of the base film 32 in this case. Each of the MnBiPt magnetic layers 3n is made thin in thickness of 0.5 to 5 nm and each of the Sr nonmagnetic layers 34n is made thin in thickness of 0.5 to 2 nm. Reference numeral 35 denotes a protective film made of SiN for anti-oxidant action; reference numeral 36 a protective coating layer made of an acrylic resin; and reference numeral 37 denotes a recording film. The recording film 37 is formed by alternately laminating the MnBiPt magnetic layers 33n and Sr nonmagnetic layers 34n each other to have n pairs of magnetic and nonmagnetic layers ($33_1$, $34_1$; . . . ; $33_n$, $34_n$) (n=4 to 50) on the base film 32.

In this case, the films 32 to 36 provided on the substrate 31 were formed by magnetron sputtering or vacuum evaporation under the conditions of a base pressure of $10^{-6}$ Torr or lower, a substrate temperature of 50° to 130° C., and a film forming rate of 0.03 to 1 nm/sec. The condition of film thickness was so set that the base film 32 was 2 to 5 nm, the protective film 35 was 80 to 100 nm, the protective coating layer 36 was 3 to 6 $\mu$m, and the recording film 37 was 25 to 50 nm.

The X ray diffraction patterns of the Sb base film 32 and the recording film 37 formed under the above-described conditions were measured and, as a result, it was verified that, due to the orientation of the plane (111) of the base film 32, the plane (00k) of the recording film 37 is oriented in parallel to the plane of the substrate so that the C axis of the recording film 37 is oriented perpendicular to the plane of the substrate.

FIG. 5 shows a Kerr hysteresis loop (measuring wavelength: 830 nm) in the direction perpendicular to the film plane of the magneto-optical recording medium having the above-described arrangement. The rectangular ratio of the Kerr hysteresis loop is approximately 1, which means that a successful perpendicular magnetic anisotropy film has been obtained.

This result can be attributed to the following facts. That is, the Sr film, which is of a face centered cubic crystal, has its crystal plane (111) oriented in parallel to the plane of the substrate at a temperature of 130° C. or lower depending on the selected film formation conditions. Further, the lattice constant of approximate 0.61 nm leads to an interatomic spacing of approximately 0.43 nm in the plane (111) of the Sr film and the angle formed by the atoms in the plane (111) is approximately 60 degrees, while the lattice constant in the plane (002) of the MnBiPt film of a hexagonal crystal is approximately 0.43 nm and the angle formed by crystal axes thereof is approximately 60 degrees, and therefore the atomic arrangement of the Sr film is successfully matched with the atomic arrangement of the MnBiPt film, so that a MnBiPt film can be epitaxially grown with an Sr film used as the base film. Finally, the MnBiPt film has a C-axis-oriented crystalline magnetic anisotropy.

In this case, the coercive force was around 1 kilooersted, and the Kerr rotation angle was around 0.8 degree, which testifies that excellent performance as a magneto-optical recording medium was obtained. Further, the Kerr rotation angle showed a Large value as much as 0.5 degree or more in a wide range of wavelength from 400 to 830 nm.

FIG. 6 shows a matched condition between the atomic arrangement of the Sr film and the atomic arrangement of the MnBi alloy film. As shown in FIG. 6, the lattice constant L3 of approximate 0.61 nm leads to an interatomic spacing L4 of approximately 0.43 nm in the plane (111) of the Sr film and the angle Θ1 formed by the atoms in the plane (111) thereof is approximately 60 degrees, while the lattice constant L2 in the plane (002) of the MnBiPt film of a hexagonal crystal is approximately 0.43 nm and the angle Θ2 formed by crystal axes thereof is approximately 60 degrees, and therefore the atomic arrangement of the Sr film is successfully matched with the atomic arrangement of the MnBiPt film, so that a MnBiPt film can be epitaxially grown with an Sr film used as the base film.

The magneto-optical recording medium of the present embodiment proved to be relatively stable both thermally and chemically such that neither characteristic deterioration nor generation of corrosion was observed when subjected to rapid cooling after heat treatment at a temperature of 400° C. for one hour and subjected to a leaving test for 2000 hours under a high-temperature, high-humidity environment of 80° C. and 80% RH.

It is noted that since Sr is a nonmagnetic metal material, the thickness of the base film is appropriately 5 nm or less, allowing light to transmit the Sr film substantially. Also, since any Mn alloy magnetic film composed of two or more elements tends to be disarranged in its orientation of crystal face as the film thickness increases and to yield a crystal phase change, therefore the thickness of each extremely thin film layer to be laminated is appropriately 5 nm or less.

Although in this embodiment, an Sr film is used as the base film 32 and an alternate lamination pair of extremely thin film layers of MnBiPt and Sr each other is used for forming the recording film 37, yet instead of using the Sr film layer, there may be used a Yb film layer (which is of face centered cubic crystal having interatomic spacing in the plane (111) of approx. 0.39 nm) or the like, and instead of using the MnBiPt film layer, there may be used a MnBi, MnSbBi film layer, or any of these materials with one or more elements selected from Al, Cu, Ge, Si, Ti, and the like added thereto.

Embodiment 3

Figure 7:
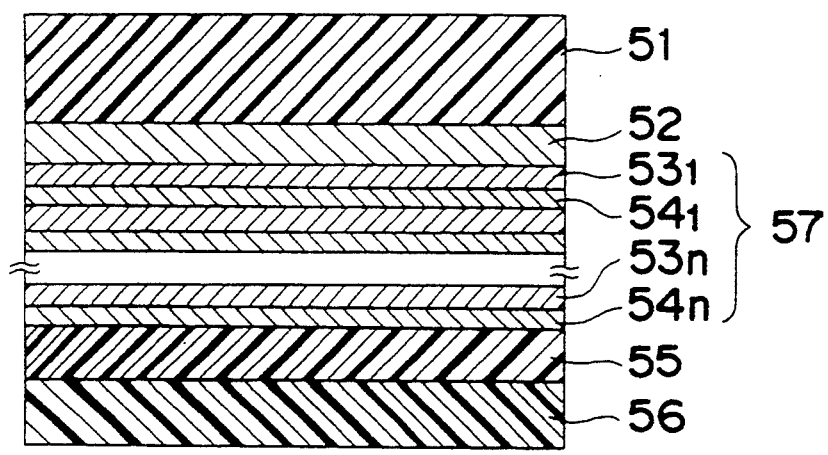
FIG. 7 is a cross sectional view showing an arrangement of a magneto-optical recording medium according to a third embodiment of the invention.

The following describes a third embodiment of a magneto-optical recording medium according to the present invention with reference to FIG. 7.

Referring to FIG. 7, reference numeral 51 denotes a substrate made of transparent plastics, glass, or the like materials; reference numeral 52 a base film made of rhombohedral crystal such as As; $53n$ (n=4 to 50) a magnetic film layer made of Mn alloy such as MnSbBi; $54n$ (n=4 to 50) a nonmagnetic film layer made of face centered cubic crystal such as Yb which is different from that of the base film 52 in this case. Each of the MnSbBi magnetic layers $53n$ is made thin in thickness of 0.5 to 5 nm and each of the Yb nonmagnetic layers $54n$ is made thin in thickness of 0.5 to 2 nm. Reference numeral 55 denotes a protective film made of SiN for anti-oxidant action; reference numeral 56 a protective coating layer made of an acrylic resin; and reference numeral 57 denotes a recording film. The recording film 57 is formed by alternately laminating the MnSbBi magnetic layers $53n$ and Yb nonmagnetic layers $54n$ each other to have n pairs of magnetic and nonmagnetic layers ($53_1$, $54_1$; ... ; $53_n$, $54_n$) (n=4 to 50) On the base film 52.

In this case, the films 52 to 56 provided on the substrate 51 were formed by magnetron sputtering or vacuum evaporation under the conditions of a base pressure of $10^{-6}$ Torr or lower, a substrate temperature of 50° to 130° C., and a film forming rate of 0.03 to 1 nm/sec. The condition of film thickness was so set that the base film 52 was 5 to 10 nm, the protective film 55 was 80 to 100 nm, the protective coating layer 56 was 3 to 6 μm, and the recording film 57 was 25 to 50 nm.

The X ray diffraction patterns of the As base film 52 and the recording film 57 formed under the above-described conditions were measured and, as a result, it was verified that, due to the orientation of the plane (00l) of the base film 52, the plane (00k) of the recording film 57 is also oriented in parallel to the plane of the substrate so that the C axis of the recording film 57 is oriented perpendicular to the plane of the substrate.

Accordingly, even with such an arrangement that the base film is of a hexagonal or rhombohedral crystal as in the first embodiment while the nonmagnetic film is of a face centered cubic crystal as in the second embodiment to be alternately laminated with the aforementioned magnetic film each other, each having a thickness of 5 nm or less, there can be obtained a successful perpendicular magnetic anisotropy film.

Embodiment 4

Figure 8:
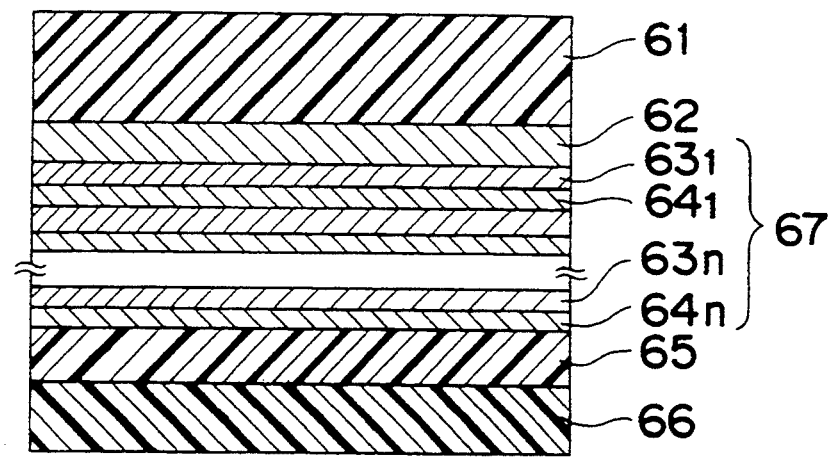
FIG. 8 is a cross sectional view showing an arrangement of a magneto-optical recording medium according to a fourth embodiment of the invention.
Figure 9:
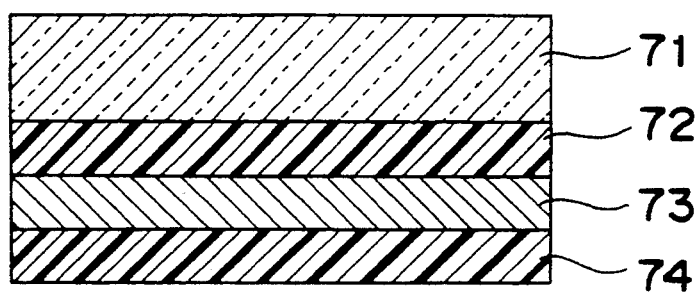
FIG. 9 is a cross sectional view showing an arrangement of a conventional magneto-optical recording medium.
Figure 10:
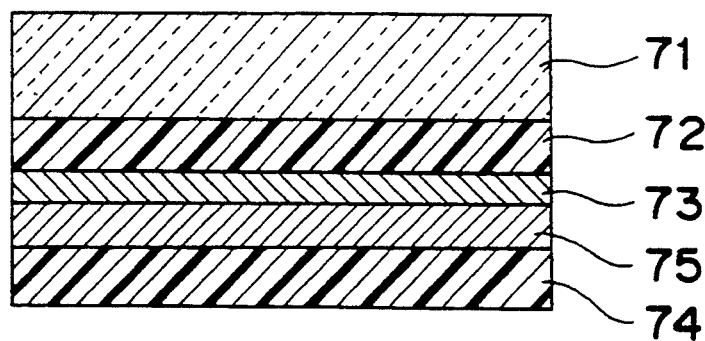
FIG. 10 is a cross sectional view showing another arrangement of a conventional magneto-optical recording medium.

The following describes a fourth embodiment of a magneto-optical recording medium according to the present invention with reference to FIG. 8.

Referring to FIG. 8, reference numeral 61 denotes a substrate made of transparent plastics, glass, or the like materials; reference numeral 62 a base film made of face centered cubic crystal such as Sr; $63n$ (n=4 to 50) a magnetic film layer made of Mn alloy such as MnBi; $64n$ (n=4 to 50) a nonmagnetic film layer made of rhombohedral crystal such as Te which is different from that of the base film 62 in this case. Each of the MnBi magnetic layers $63n$ is made thin in thickness of 0.5 to 5 nm and each of the Te nonmagnetic layers $64n$ is made thin in thickness of 0.5 to 5 nm. Reference numeral 65 denotes a protective film made of SiN for anti-oxidant action; reference numeral 66 a protective coating layer made of an acrylic resin; and reference numeral 67 denotes a recording film. The recording film 67 is formed by alternately laminating the MnBi magnetic layers $63n$ and Te nonmagnetic layers $64n$ each other to have n pairs of magnetic and nonmagnetic layers ($63_1$, $64_1$; ... ; $63_n$, $64_n$) (n=4 to 50) on the base film 62.

In this case, the films 62 to 66 provided on the substrate 61 were formed by magnetron sputtering or vacuum evaporation under the conditions of a base pressure of $10^{-6}$ Torr or lower, a substrate temperature of 50° to 130° C., and a film forming rate of 0.03 to 1 nm/sec. The condition of film thickness was were so set that the base film 62 was 2 to 5 nm, the protective film 65 was 80 to 100 nm, the protective coating layer 66 was 3 to 6 μm, and the recording film 67 was 25 to 50 nm.

The X ray diffraction patterns of the Sr base film 62 and the recording film 67 formed under the above-described conditions were measured and, as a result, it was verified that, due to the orientation of the plane (1l1) of the base film 62, the plane (00k) of the recording film 67 is also oriented in parallel to the plane of the substrate so that the C axis of the recording film 67 is oriented perpendicular to the plane of the substrate.

Accordingly, even with such an arrangement that the base film is of a face centered cubic crystal material as in the second embodiment while the nonmagnetic film is of a hexagonal or rhombohedral crystal material as in the first embodiment to be alternately laminated with the aforementioned magnetic film each other, each having a thickness of 5 nm or less, there can be obtained a successful perpendicular magnetic anisotropy film.

As described in the above embodiments, a base film may be made of any one crystal material selected from hexagonal crystal, rhombohedral crystal and face centered cubic crystal materials, while each of the nonmagnetic thin film layers may be made of any one crystal material selected from hexagonal crystal, rhombohedral crystal and face centered cubic crystal materials. Therefore there may be selected nine ways of combination as the materials of the base film and nonmagnetic thin film layer.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A magneto-optical recording medium which comprises:
    a substrate through which an incident light signal to be recorded is transmitted, said substrate having a plane;
    a base film formed on said substrate, said base film being comprised of any one crystal material selected from the group consisting of hexagonal crystal material and rhombohedral crystal material, having its (00l) plane oriented in parallel to the plane of said substrate;
    a magnetic recording film formed on said base film for recording the light signal therein, said recording film comprised of plural pairs of Mn alloy magnetic film layers and nonmagnetic film layers alternately laminated with each other, wherein each Mn alloy magnetic film layer has a thickness in a range of 0.5 to 5 nm and is comprised of a hexagonal crystal material having a C-axis-oriented crystalline magnetic anisotropy with a lattice constant in its (00k) plane which is approximately equal to the lattice constant in the (00l) plane of said base film, while each nonmagnetic film layer has a thickness in a range of 0.5 to 5 nm and is comprised of any one crystal material selected from the group consisting of hexagonal crystal material and rhombohedral crystal material having a lattice constant in its (00h) plane which is approximately equal to the lattice constant in the (00l) plane of said base film, and wherein l, k, and h represent positive integers.

2. The magneto-optical recording medium as claimed in claim 1, wherein said base film is comprised of any one material selected from the group consisting of Sb film, Te film, and As film, wherein said Mn alloy magnetic film layer is comprised of any one material selected from the group consisting of MnBi alloy and MnSbBi alloy materials, and wherein said nonmagnetic film layer is comprised of any one material selected from the group consisting of Sb, Te, and As materials.

3. The magneto-optical recording medium as claimed in claim 2, wherein said MnBi alloy or MnSbBi alloy material further includes an element selected from the group consisting of Al, Cu, Ge, Pt, Si and Ti added thereto.

4. A magneto-optical recording medium which comprises:
    a substrate through which an incident light signal to be recorded is transmitted, said substrate having a plane;
    a base film formed on said substrate, said base film being comprised of a face centered cubic crystal material having its (1l1) plane oriented in parallel to the plane of said substrate;
    a magnetic recording film formed on said base film for recording the light signal therein, said recording film comprised of plural pairs of Mn alloy magnetic film layers and nonmagnetic film layers alternately laminated with each other, wherein each Mn alloy magnetic film layer has a thickness in a range of 0.5 to 5 nm and is comprised of a hexagonal crystal material having a C-axis-oriented crystalline magnetic anisotropy with a lattice constant in its (00k) plane which is approximately equal to the interatomic spacing in the (1l1) plane of said base film, while each nonmagnetic thin film layer has a thickness in a range of 0.5 to 5 nm and is comprised of a face centered cubic crystal material having an interatomic spacing in its (hhh) plane which is approximately equal to the interatomic spacing in the (1l1) plane of said base film, and wherein l, k and h represent positive integers.

5. The magneto-optical recording medium as claimed in claim 4, wherein said base film is comprised of any one material selected from the group consisting of Sr and Yb materials, wherein said Mn alloy magnetic film layer is comprised of any one material selected from the group consisting of MnBi, MnSbBi materials, and wherein said nonmagnetic film layer is comprised of any one material selected from the group consisting of Sr and Yb materials.

6. The magneto-optical recording medium as claimed in claim 5, wherein said MnBi alloy or MnSbBi alloy material further includes an element selected from the group consisting of Al, Cu, Ge, Pt, Si and Ti added thereto.

7. A magneto-optical recording medium which comprises:
    a substrate through which an incident light signal to be recorded is transmitted, said substrate having a plane;
    a base film formed on said substrate, said base film being comprised of any one crystal material selected from the group consisting of hexagonal crystal material and rhombohedral crystal material having its (00l) plane oriented in parallel to the plane of said substrate;

a magnetic recording film formed on said base film for recording the light signal therein, said recording film comprised of plural pairs of Mn alloy magnetic film layers and nonmagnetic film layers alternately laminated with each other, wherein each Mn alloy magnetic film layer has a thickness in a range of 0.5 to 5 nm and is comprised of a hexagonal crystal material having a C-axis-oriented crystalline magnetic anisotropy with a lattice constant in its (00k) plane which is approximately equal to the lattice constant in the (00l) plane of said base film, while each nonmagnetic film layer has thickness in a range of 0.5 to 5 nm and is comprised of a face centered cubic crystal material having an interatomic spacing in the (hhh) plane approximately equal to the lattice constant in the (00l) plane of said base film, and wherein l, k and h represent positive integers.

8. The magneto-optical recording medium as claimed in claim 7, wherein said base film is comprised of any one material selected from the group consisting of Sb, Te and As materials, wherein said Mn alloy magnetic film layer is comprised of any one material selected from the group consisting of MnBi alloy and MnSbBi alloy materials, and wherein said nonmagnetic film layer is comprised of any one material selected from the group consisting of Sr and Yb materials.

9. The magneto-optical recording medium as claimed in claim 8, wherein said MnBi alloy or MnSbBi alloy material further includes an element selected from the group consisting of Al, Cu, Ge, Pt, Si and Ti added thereto.

10. A magneto-optical recording medium which comprised:

a substrate through which an incident light signal to be recorded is transmitted, said substrate having a plane;

a base film formed on said substrate, said base film being comprised of a face centered cubic crystal material having its (1ll) plane oriented in parallel to the plane of said substrate;

a magnetic recording film formed on said base film for recording the light signal therein, said recording film comprised of plural pairs of Mn alloy magnetic film layers and nonmagnetic film layers alternately laminated with each other, wherein each Mn alloy magnetic film layer has a thickness in a range of 0.5 to 5 nm and is comprised of a hexagonal crystal material having a C-axis-oriented crystalline magnetic anisotropy with a lattice constant in its (00k) plane which is approximately equal to the interatomic spacing in the (1ll) plane of said base film, while each nonmagnetic film layer has a thickness in a range of 0.5 to 5 nm and is comprised of any one material selected from the group consisting of hexagonal crystal and rhombohedral crystal materials having a lattice constant in its (00h) plane which is approximately equal to the interatomic spacing in the (1ll) plane of said base film, and wherein l, k and h represent positive integers.

11. The magneto-optical recording medium as claimed in claim 10, wherein said base film is comprised of any one material selected from the group consisting of Sr and Yb materials, wherein said Mn alloy magnetic film layer is comprised of any one material selected from the group consisting of MnBi and MnSbBi materials, and wherein said nonmagnetic film layer is comprised of any one material selected from the group consisting of Sb, Te and As materials.

12. The magneto-optical recording medium as claimed in claim 11, wherein said MnBi alloy or MnSbBi alloy material further includes an element selected from the group consisting of Al, Cu, Ge, Pt, Si and Ti added thereto.

* * * * *